United States Patent [19]

Wojciechowski et al.

[11] Patent Number: 4,506,599
[45] Date of Patent: Mar. 26, 1985

[54] DEVICE FOR REMOVAL OF ETHYLENE FROM FRUIT STORAGE CHAMBERS

[75] Inventors: Jerzy Wojciechowski; Jerzy Haber, both of Cracow; Zygmunt Gozdziewicz, Kedzierzyn-Kozle; Edward Lange, Skierniewice, all of Poland

[73] Assignee: Polska Akademia Nauk, Instytut Katalizy I Fizykochemii Powierzchni, Cracow, Poland

[21] Appl. No.: 563,408

[22] Filed: Dec. 20, 1983

[51] Int. Cl.³ .............................................. A23B 7/00
[52] U.S. Cl. ..................................... 99/469; 99/467; 99/474; 99/476; 422/40; 422/113
[58] Field of Search ................. 99/467, 468, 469, 472, 99/473–476, 516, 485, 646 R; 426/418, 419; 422/29, 32, 40, 111, 305, 130, 115, 116, 198, 208; 165/170

[56] References Cited

U.S. PATENT DOCUMENTS 3,313,630 4/1967 Harvey, Jr. ........................ 426/314
3,333,967 8/1967 Burg .................................... 426/419

FOREIGN PATENT DOCUMENTS 1692187 10/1974 Fed. Rep. of Germany .
218257 3/1979 Poland .

Primary Examiner—Timothy F. Simone

[57] ABSTRACT

A system for removing ethylene from fruit storage chambers by catalytic combustion of ethylene in a closed circuit, wherein two heated catalytic reactors, each packed with catalyst and therebelow successive layers of material of weak heat conductivity, such as ceramics, and good heat conductivity, such as metal shavings, the reactors being connected therebetween by a collector to transpose gases from one reactor to the other, and a conduit provided with a heat exchanger connected between the collector and a storage chamber to conduct a small portion of the combusted gases to the storage chamber and cool the same before introduction thereto, and fan means for alternately conducting gas to and from the reactors and the storage chambers.

2 Claims, 1 Drawing Figure

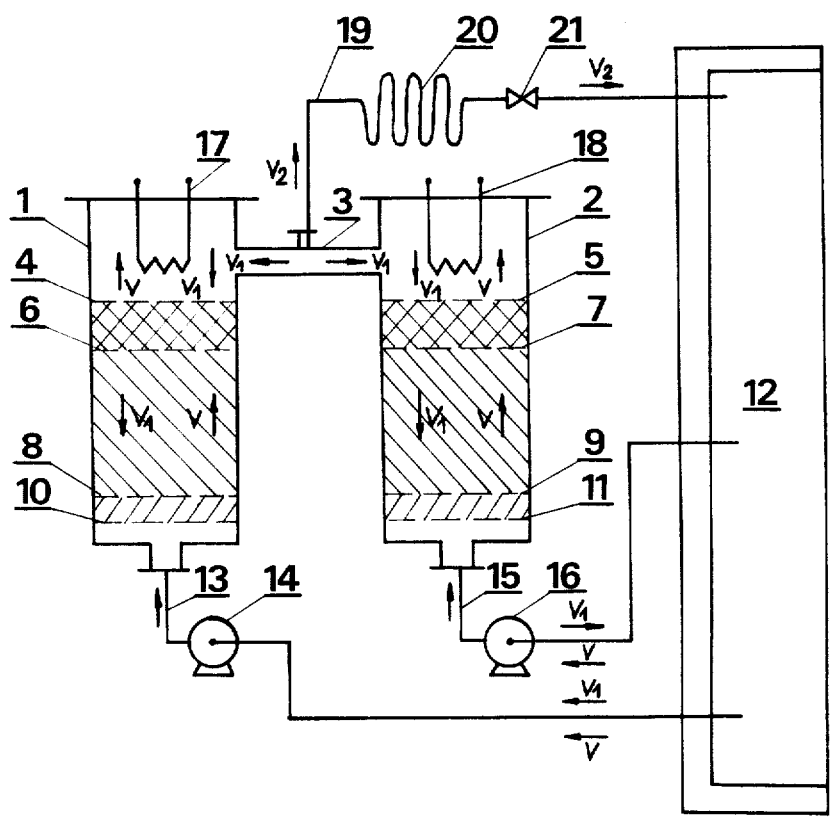

DEVICE FOR REMOVAL OF ETHYLENE FROM FRUIT STORAGE CHAMBERS

The subject of the present invention is a device for removal of ethylene from storage chambers by means of catalytic combustion of ethylene in reactors in which the direction of the stream of gas is switched over cyclically to the reverse one.

The presence of ethylene evolving as the result of biological processes during the storage of fruits is unfavourable because it accelerates their ripening and, thus, shortens the storage period of stored products.

The content of ethylene in the air during the period of storing the fruits can increase even up to a dozen or so thousand ppm.

Therefore, in order to prolong the period of storing the fruits in a fresh state it is necessary to remove ethylene from their environment, preferably to a content below 1 ppm.

Taking into consideration the aforesaid, a number of technological methods of removing ethylene from the atmosphere surrounding the stored vegetable products have been worked out. These methods comprise, among others, hypobaric storage, i.e. in conditions of a permanently reduced pressure, with maintenance of ventillation. During hypobaric storage continuous recovery of ethylene from the environment of fruits occurs, due to which it should not accumulate in an amount which would initiate ripening of vegetable products. The hypobaric method of removing ethylene is known from the U.S. Pat. No. 3,333,967.

When applied on a large scale, this method of storage is very expensive because it requires building of chambers resistant to a high pressure exerted from the outside and resulting from a big pressure difference between the atmospheric pressure and the pressure inside the chambers. High costs of building and special building requirements make this method little practical.

Those skilled in the art know also the removal of ethylene from the atmosphere surrounding the stored products by means of absorption or adsorption. And so, for example, the said atmosphere is kept in continous circulation, being sent through washers with potassium permanganate, with acid potassium carbonate or active carbon, and being turned back to the storage chamber. These methods are, however, unsatisfactory because not only ethylene is adsorbed but also other volatile substances, including also $CO_2$. However, for storage purposes it is preferable that the $CO_2$ content is relatively high, reaching even 20% by volume. Thus, the non-selective course of adsorption results in that the composition of the air returning to storage chambers is unsuitable.

Independently of the above indicated inconveniencies, the degree of the removal of ethylene by means of adsorption is insufficient. By the adsorption method the ethylene content can be reduced to several hundred ppm, and only with the use of very fresh adsorption solutions (which decompose very quickly) to several dozens ppm.

The adsorption method applied in the preservation of animal and agricultural products is known, for example, from U.S. Pat. No. 2,313,630 which describes the process and the equipment for purification of gases from storage chambers from $CO_2$, ethylene, aldehydes and ketones by means of adsorption conducted on synthetic zeolites.

The hitherto known industrial solutions applied for catalytic combustion of ethylene do not lead to the intended effect, that is they cannot be applied in the storage of horitcultural products because the content of ethylene evolved in the biological processes during the storage of fruits and vegetables is minimal—measured in ppm and is considerably lower than the ethylene content appearing in waste gases emitted to the outside from industrial processes of catalytic combustion of ethylene.

From Polish patent specification no. P-218257 a method of catalytic removal of ethylene by combustion is known.

In the said process ethylene is removed from a gaseous stream circulating between the storage chamber and the reactor. The process is conducted in a cylindrical reactor inside of which there is a platinic catalyst activated by impregnation with fatty acid and deposited on the bed in a form of activated aluminium oxide. The reaction of combustion of ethylene to carbon dioxide and water proceeds within the temperature range of 250°–350° C. In the layer of the catalytic bed an electric heater is situated.

Hot post-reaction gases are cooled to such a temperature as is in the storage chamber and are directed to the chamber. Depending on the size of storage chambers and the amount of fruits stored therein, the removal of ethylene is conducted continuously or for several hours per 24-hour-period.

The solution requires the application of separate water coolers situated outside the reactor, to cool post-reaction gases to a temperature of the order of several degrees, applied in the storage chambers.

The object of the present invention is to provide a solution enabling an improvement of the economics of the process of removing ethylene from storage chambers, that is a reduction of the costs of energy necessary for heating the gases to the reaction temperature and lowering the losses resulting from the process of cooling the gases in water coolers.

The essence of the invention consists in obtaining a high temperature in the catalyst bed and a low temperature of the gas leaving the reactor, close to the temperature maintained in the storage chamber, and to appropriate adaptation of the equipment for the realisation of the process.

In the solution according to the present invention the gas leaving the apparatus, fed to the storage chamber, has a temperature higher by only a few degrees from that of the gas collected from the chamber, despite the fact that the temperature of the catalyst bed is of the order of 200°–300° C.

This unexpected effect is obtained by applying two reactors connected by a collector, which work alternately in several-minutes' cycles. In the reactors themselves the layers of the catalyst from the side of the gas inlet adjoin the layers accumulating heat, preferably ceramic shapes in a form of small balls, small cylinders or irregular granular of the effective diameter below 10 mm.

On the other hand, the layers of weak heat conductivity adjoin the layers in the form of elements of good heat conductivity, such as metal elements, preferably aluminium elements in a form of small balls, cylinders, spirals or grids.

Referring to the drawing, the gas stream V after passing the reaction zone of a high temperature is divided in a collector 3 connecting the reactors into two streams V1 and V2. The part of the stream V2 is from 1 to 10% of V and is discharged from the collector by a conduit in a form of a spiral, wherein it is cooled to a temperature close to the surrounding temperature and fed to the storage chamber 12.

The stream V1 passes through a reactor 2 via fan 14 and inversely through a reactor 1 via fan 15, giving its heat to the layers accumulating heat, and next, cooled to a temperature not much higher from the temperature of the inlet gas it enters the storage chamber.

In certain cases, by applying a small release of gas V2 from the collector 3, it is caused that the stream of gas flowing upwards is bigger than the stream of gas flowing downwards, due to which heat accumulates to a bigger extent in the catalyst bed, whereas a relatively small stream of gas flowing from the central part to the chamber is easily cooled to the ambient temperature without changing the heat balance of the cold storage chamber 12.

More specifically, the device for removal of ethylene from fruit storage chambers is presented in the attached drawing in which reactors 1 and 2 are connected by a collector 3. Reactors 1 and 2 are of identical design and have inside perforated partitions 4 and 5 and 6 and 7 between which layers of a complete combustion catalyst are disposed, below which are partitions 8 and 9 on which a packing of weak heat conductivity is disposed, and on partitions 10 and 11 there are layers of a packing with good heat conductivity in a form of metal elements of fine shapes.

The reactor 1 is connected from below with a storage chamber 12 by a conduit 13 on which a fan 14 is situated, which sucks the gas from the chamber and forces it through the reactors alternately with the fan 16.

The reactor 2 is connected with the chamber 12 by a conduit 15 through a fan 16 sucking the gas from the chamber and forcing it through the reactors alternately with the fan 14. In the upper part of reactors 1 and 2 electric heaters 17 and 18 are mounted, whereas the collector 3 is connected by a conduit 19 with a helical part 20 and by a valve 21 directly with the storage chamber 12. The device operates in a closed cycle and the stream of gas V in the process of suction from the chamber is divided at the ratio of 10–100:1 into streams V1 and V2, whereby the stream V1 flows through the next reactor, and the stream V2 through the conduit 19, the spiral 20 and the valve 21 directly to the storage chambe 12.

The heaters 17, 18 increase the temperature of the catalyst bed in order to initiate the burning of ethylene. The purpose of having the spiral means 20 is to cool down the gas flowing from the collector 3, before it enters the chamber 12.

The device according to the invention enables the removal of ethylene from gaseous mixtures contained in storage chambers at a content below 1 ppm, at a very low energy consumption.

The use of two layers accumulating heat and alternately yielding the heat to the gas stream, as well as a partial release of hot gas from the central part of the apparatus to the chamber enables achieving an advantageous heat balance in the reaction system, giving in the effect a big energy saving.

EXAMPLE I

In the apparatus designed according to the description of the invention, with the diameter of the reaction pipes of 300 mm, layers were prepared according to the following sequence from the bottom.

Layers of the thickness of 100 mm of aluminium shavings, produced during mechanical working of aluminium shafts, were placed on perforated partitions 10 and 11.

Subsequently on the perforated partitions 8 and 9 layers of a ceramic packing of the thickness of 600 mm were placed.

This packing is analogous to that used in building engineering for granular insulation with granules of 5–10 mm.

On the perforated partitions 6 and 7 layers of the thickness of 100 mm of platinic catalyst described in Polish Pat. No. P-218257 were deposited. The apparatus was heated with electric heaters 17 and 18 of the spiral power 0.5 kW each. The circulation of gas in the closed cycle between the storage chamber 12 and the device was provided for by fans 14 and 16 operating with the capacity of 150 m$^3$/hr. In the chamber 12 130 tons of apples were stored. The chambers were adapted to the storage of fruits in a controlled atmosphere.

The concentration of oxygen was maintained within the limits of from 3 to 4% by volume, and $CO_2$ from 3 to 4 by volume.

At the beginning of the reactors for finishing the burning of ethylene, the concentration of ethylene in the chamber was 420 ppm.

After 72 hours of operation of the device, the ethylene content in the chamber lowered to 0.9 ppm and was maintained at this level.

The temperature of gas circulating at the inlet of the apparatus was 2° C., and at the outlet 8° C. The temperature of the bed was maintained at the level of 330° C. After opening the valve 21 on the conduit 19 and releasing the part of V2 from the stream V being 5 m$^3$/hr the temperature of the bed was lowered to 240° C. and at the same time the temperature of the gas stream V1 was lowered to the value of 3° C. to 5° C., and to the storage chamber 12 gas at a temperature of 5° C. entered. The conversion of ethylene in both cases was the same and was 90% because the catalyst was adapted to operation at a temperature of from 200° C.

EXAMPLE II

The test was repeated with the procedure similar as in example I, the difference being that through the conduit 19 15 m$^3$ of gas per hour was released. In this case the temperature of the catalyst lowered to 160° C., which caused a drop in the conversion of ethylene to 70% and an increase of the ethylene concentration in the chamber to the value of 3 ppm.

EXAMPLE III

The test was conducted similarly as in example I, changing the lower layer of the packing from metal to ceramic. In this case the temperature of the inlet gas was higher by 1° C. than in example I, which was less advantageous as in example I.

What is claimed is:

1. A system for removal of ethylene from fruit storage chambers by means of catalytic combustion of ethylene and the closed circulation of gas through the system, comprising two catalytic reactors connected with a storage chamber and further connected therebetween with collector means for transporting gases between said reactors and for transmitting a portion of said gases to said storage chamber, each reactor being provided in the upper part thereof with electric heating means, a combustion catalyst bed, packing material of weak heat conductivity disposed beneath said catalyst bed, and metallic packing material of good heat conductivity disposed beneath said aforesaid packing material, separate conduit means for connecting the lower portion of each reactor to said storage chamber, and fan means within each said conduit means for alternate and reversible operation to conduct gas to and from said storage chamber, and a further conduit means connecting said collector means to said storage chamber, said further conduit means being provided with heat exchange means for cooling by air, at ambiant temperature, gases returned through said further conduit to said storage chamber, and valve means disposed in said further conduit for regulating the flow of gas from said collector means to said storage chamber such that the ratio of the volume of gas removed from said storage chamber to the volume of gas returned to said chamber is from about 10–100:1.

2. A system according to claim 1, wherein said heat exchange means is in the form of a spiral conduit exposed to the atmosphere.

* * * * *